United States Patent
Cai et al.

(10) Patent No.: US 10,949,113 B2
(45) Date of Patent: Mar. 16, 2021

(54) RETENTION AWARE BLOCK MAPPING IN FLASH-BASED SOLID STATE DRIVES

(71) Applicant: SK Hynix Inc., Gyeonggi-do (KR)

(72) Inventors: Yu Cai, San Jose, CA (US); Naveen Kumar, San Jose, CA (US); Aman Bhatia, San Jose, CA (US); Fan Zhang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/136,989

(22) Filed: Sep. 20, 2018

(65) Prior Publication Data

US 2019/0212940 A1    Jul. 11, 2019

Related U.S. Application Data

(60) Provisional application No. 62/615,839, filed on Jan. 10, 2018.

(51) Int. Cl.
| | |
|---|---|
| *G06F 3/06* | (2006.01) |
| *G06F 12/02* | (2006.01) |
| *G06F 11/07* | (2006.01) |

(52) U.S. Cl.
CPC ............ *G06F 3/0649* (2013.01); *G06F 3/064* (2013.01); *G06F 3/0619* (2013.01);
(Continued)

(58) Field of Classification Search
CPC .............. G06F 1/00–3296; G06F 3/00; G06F 3/06–0689; G06F 5/00–16;
(Continued)

(56) References Cited

U.S. PATENT DOCUMENTS

| 6,906,961 B2 * | 6/2005 | Eggleston ........... G06F 11/1068 |
| | | 365/185.29 |
| 7,350,101 B1 * | 3/2008 | Nguyen .............. G06F 11/1084 |
| | | 711/114 |

(Continued)

OTHER PUBLICATIONS

J. Guo, D. Wang, Z. Shao and Y. Chen, "Data-Pattern-Aware Error Prevention Technique to Improve System Reliability," in IEEE Transactions on Very Large Scale Integration (VLSI) Systems, vol. 25, No. 4, pp. 1433-1443, Apr. 2017 (Year: 2017).*

(Continued)

*Primary Examiner* — Daniel C. Chappell
(74) *Attorney, Agent, or Firm* — Kilpatrick Townsend & Stockton LLP

(57) ABSTRACT

Techniques for profiling storage blocks in non-transitory memory (e.g., flash memory dies) to determine their retention capability, and assigning them with labels based on retention, are described. A superblock (SB) can be formed from physical blocks with the same labels located in different dies. The disclosed system and methods improve storage efficiency when the update frequency of stored data is non-uniform, as is typically the case. Moreover, the disclosed embodiments improve the reliability of solid state drives (SSDs), as well as reduce data refresh frequency and write amplification due to periodic refresh. A storage system can comprise a controller configured to obtain expected retention times for a plurality of storage blocks. The controller can partition the blocks into superblocks based on the retention times. A respective superblock is associated with a superblock retention time range, and contains blocks having expected retention times within the retention time range.

20 Claims, 12 Drawing Sheets

---

Obtain data to write to the storage system and an expected update time for the data 710

↓

Select a first superblock based on matching the expected update time for the data with the superblock retention time range associated with the first superblock 720

↓

Write the data to the first superblock 730

(52) U.S. Cl.
CPC .......... *G06F 3/0679* (2013.01); *G06F 11/076* (2013.01); *G06F 12/0246* (2013.01); *G06F 2212/7201* (2013.01)

(58) Field of Classification Search
CPC ..... G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11C 11/00–5692; G11C 13/00–06; G11C 14/00–009; G11C 15/00–06; G11C 16/00–3495; G11C 17/00–18; G11C 2216/00–30

See application file for complete search history.

(56) References Cited

U.S. PATENT DOCUMENTS

| | | | | |
|---|---|---|---|---|
| 8,219,724 | B1* | 7/2012 | Caruso | G06F 3/0604 |
| | | | | 710/36 |
| 8,612,804 | B1* | 12/2013 | Kang | G11C 16/349 |
| | | | | 714/42 |
| 8,645,770 | B2* | 2/2014 | Fai | G11C 11/406 |
| | | | | 714/704 |
| 8,862,810 | B2* | 10/2014 | Lee | G06F 3/061 |
| | | | | 711/103 |
| 8,976,589 | B2* | 3/2015 | Suzuki | G11C 29/04 |
| | | | | 365/185.11 |
| 9,081,663 | B2* | 7/2015 | Melik-Martirosian | |
| | | | | G06F 3/0644 |
| 9,589,661 | B2* | 3/2017 | Kim | G11C 16/349 |
| 9,658,800 | B2* | 5/2017 | Darragh | G11C 16/3422 |
| 9,665,295 | B2* | 5/2017 | Fitzpatrick | G11C 11/5635 |
| 9,811,414 | B2* | 11/2017 | Yang | G06F 11/14 |
| 9,959,067 | B2* | 5/2018 | Yang | G06F 11/08 |
| 10,185,609 | B2* | 1/2019 | Lin | G11C 16/34 |
| 2008/0052446 | A1 | 2/2008 | Lasser et al. | |
| 2009/0172262 | A1* | 7/2009 | Olbrich | G06F 13/1657 |
| | | | | 711/103 |
| 2009/0327592 | A1* | 12/2009 | Chang | G06F 12/0246 |
| | | | | 711/103 |
| 2010/0131697 | A1* | 5/2010 | Alrod | G06F 11/1068 |
| | | | | 711/103 |
| 2010/0228940 | A1 | 9/2010 | Asnaashari et al. | |
| 2012/0226963 | A1* | 9/2012 | Bivens | G11C 29/76 |
| | | | | 714/773 |
| 2013/0054881 | A1* | 2/2013 | Ellis | G06F 12/0246 |
| | | | | 711/103 |
| 2013/0060994 | A1* | 3/2013 | Higgins | G06F 12/0246 |
| | | | | 711/103 |
| 2013/0073788 | A1* | 3/2013 | Post | G06F 12/0246 |
| | | | | 711/103 |
| 2014/0136927 | A1* | 5/2014 | Li | G06F 11/1048 |
| | | | | 714/768 |
| 2015/0348649 | A1* | 12/2015 | Yang | G11C 29/44 |
| | | | | 714/723 |
| 2015/0370701 | A1* | 12/2015 | Higgins | G06F 12/0253 |
| | | | | 711/103 |
| 2016/0004464 | A1* | 1/2016 | Shen | G06F 3/0616 |
| | | | | 711/103 |
| 2016/0070474 | A1* | 3/2016 | Yu | G06F 3/0608 |
| | | | | 711/103 |
| 2016/0179597 | A1* | 6/2016 | Gorobets | G06F 11/073 |
| | | | | 714/704 |
| 2017/0132125 | A1* | 5/2017 | Cai | G06F 11/1072 |
| 2017/0364298 | A1* | 12/2017 | Choi | G06F 3/0611 |
| 2019/0179741 | A1* | 6/2019 | Liu | G06F 3/0616 |
| 2020/0285391 | A1* | 9/2020 | Sun | G06F 12/0246 |

OTHER PUBLICATIONS

R. Ma, F. Wu, M. Zhang, Z. Lu, J. Wan and C. Xie, "RBER-Aware Lifetime Prediction Scheme for 3D-TLC NAND Flash Memory," in IEEE Access, vol. 7, pp. 44696-44708, 2019 (Year: 2018).*

N. Mielke et al., "Bit error rate in NAND Flash memories," 2008 IEEE International Reliability Physics Symposium, Phoenix, AZ, 2008, pp. 9-19 (Year: 2008).*

S. Suzuki et al., Error elimination ECC by horizontal error detection and vertical-LDPC ECC to increase data-retention time by 230% and acceptable bit-error rate by 90% for 3D-NAND flash SSDs, 2018 IEEE International Reliability Physics Symposium (IRPS), pp. P-MY.7.1-P-My-7.4 (Year: 2018).*

* cited by examiner

RETENTION AWARE BLOCK MAPPING IN FLASH-BASED SOLID STATE DRIVES

CROSS-REFERENCES TO RELATED APPLICATIONS

The present application claims priority to Provisional Application No. 62/615,839 entitled "RETENTION AWARE BLOCK MAPPING IN FLASH-BASED SSD," filed Jan. 10, 2018, which is assigned to the assignee hereof and expressly incorporated by reference herein in its entirety.

BACKGROUND OF THE INVENTION

A solid state drive (SSD) can contain multiple flash memories, each of which typically contains thousands of physical flash memory blocks. Each flash block can retain data without loss even without a power source, for a relatively long period, such as a few days to a few years, depending on the age of the flash memory.

Due to process variations, each flash block can retain data for a different characteristic retention time. Likewise, different data files stored in flash memory may have different usage or update frequencies. Some data files may be updated in a shorter time, such as a few hours or a few days, while other data files may be updated in a longer time, e.g., a few months or even a few years. Existing SSD systems neglect the retention capability variation among different flash blocks, assigning data writes to blocks irrespective of the expected data update frequency.

BRIEF SUMMARY OF THE INVENTION

Techniques for profiling storage blocks in non-transitory memory (e.g., flash memory dies) to determine their retention capability, and assigning them with labels based on retention, are described. In an example, a storage system with improved retention efficiency comprises: a plurality of dies; a plurality of storage blocks located within the plurality of dies; and a controller. The controller is configured to obtain expected storage retention times for the plurality of storage blocks. The controller is further configured to partition the plurality of storage blocks into two or more superblocks based on the expected storage retention times. A respective superblock is associated with a superblock retention time range. The respective superblock further contains storage blocks having expected storage retention times within the superblock retention time range.

DETAILED DESCRIPTION OF THE INVENTION

Techniques are described for profiling storage blocks in non-transitory memory (e.g., flash memory dies) to determine their retention capability over time. A superblock (SB) can be formed from physical blocks with comparable retention capabilities located in different dies. The disclosed system and methods improve storage efficiency when the update frequency of stored data is non-uniform, as is typically the case. Moreover, the disclosed embodiments improve the reliability of solid state drives (SSDs), as well as reduce data refresh frequency and write amplification due to periodic refresh. In particular, in conventional systems, a superblock is formed by grouping physical blocks on different dies based on the indices (of the physical blocks (e.g., physical locations of the physical blocks on the dies). In such systems, the retention capability of the superblock equates to the smallest retention capability among the physical blocks. In other words, if one of the physical blocks is no longer usable (e.g., the one having the smallest retention capability), the entire superblock is recycled and is no longer usable. In comparison, embodiments herein optimize the retention capability and usability of a superblock. In particular, a superblock is formed by grouping physical blocks having similar retention capabilities. If one of the physical blocks becomes unusable, only that physical block is recycled. The unusable physical block is removed from the superblock and the grouping of the physical blocks in the superblock is dynamically updated. Hence, the superblock remains usable. In addition, data is written to a superblock based on the expected retention of the data and the retention capability of the superblock. In other words, hot data can be stored in a superblock with a short retention time, whereas cold data can be stored in a superblock with a long retention time. In comparison, in conventional systems, cold data is likely written to the short retention superblock, thereby potentially resulting in the loss of the data.

Figure 1:
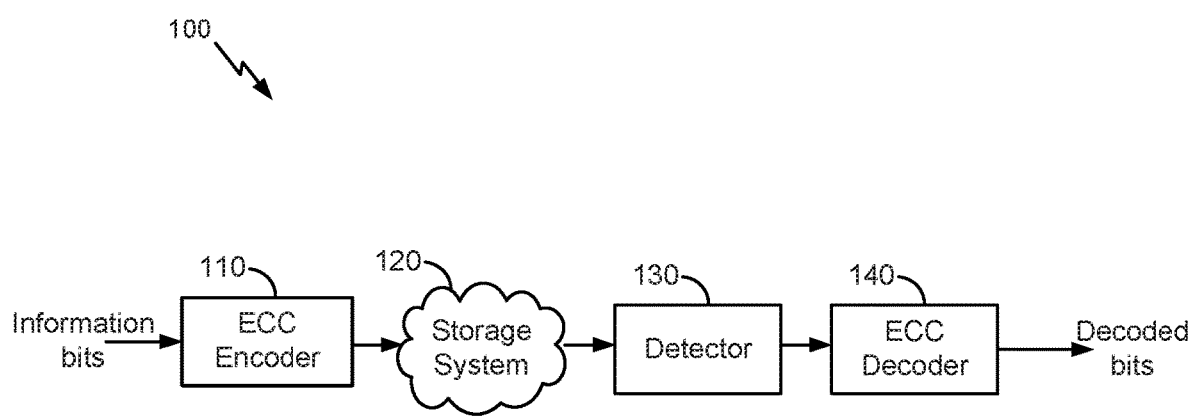
FIG. 1 illustrates an example high level block diagram of an error correcting system, in accordance with certain embodiments of the present disclosure.

FIG. 1 illustrates an example high level block diagram of an error correcting system 100, in accordance with certain embodiments of the present disclosure. As illustrated, an error-correcting code (ECC) encoder 110 receives information bits that include data which is desired to be stored in a storage system 120. Encoded data is output by the ECC encoder 110 and is written to the storage 120. In various embodiments, the storage 120 may include a variety of storage types or media such as (e.g., magnetic) disk drive storage, flash storage, etc.

When the stored data is requested or otherwise desired (e.g., by an application or user which stored the data), a detector 130 receives data from the storage system 120. The received data may include some noise or errors. The detector 130 performs detection on the received data and outputs decision and/or reliability information. For example, a soft output detector outputs reliability information and a decision for each detected bit. On the other hand, a hard output detector outputs a decision on each bit without providing corresponding reliability information. As an example, a hard output detector may output a decision that a particular bit is a "1" or a "0" without indicating how certain or sure the detector is in that decision. In contrast, a soft output detector outputs a decision and reliability information associated with the decision. In general, a reliability value indicates how certain the detector is in a given decision. In one example, a soft output detector outputs a log-likelihood ratio (LLR) where the sign indicates the decision (e.g., a positive value corresponds to a "1" decision and a negative value corresponds to a "0" decision) and the magnitude indicates how sure or certain the detector is in that decision (e.g., a large magnitude indicates a high reliability or certainty).

The decision and/or reliability information is passed to an ECC decoder 140 which performs ECC decoding using the decision and reliability information. A soft input decoder utilizes both the decision and the reliability information to decode the codeword. A hard decoder utilizes only the decision values in the decoder to decode the codeword. The decoded bits generated by the ECC decoder 140 are passed to the appropriate entity (e.g., the user or application which requested it). With proper encoding and decoding, the information bits match the decoded bits.

In various embodiments, the system shown may be implemented using a variety of techniques including an application-specific integrated circuit (ASIC), a field-programmable gate array (FPGA), and/or a general purpose processor (e.g., an Advanced RISC Machine (ARM) core).

Figure 2A:
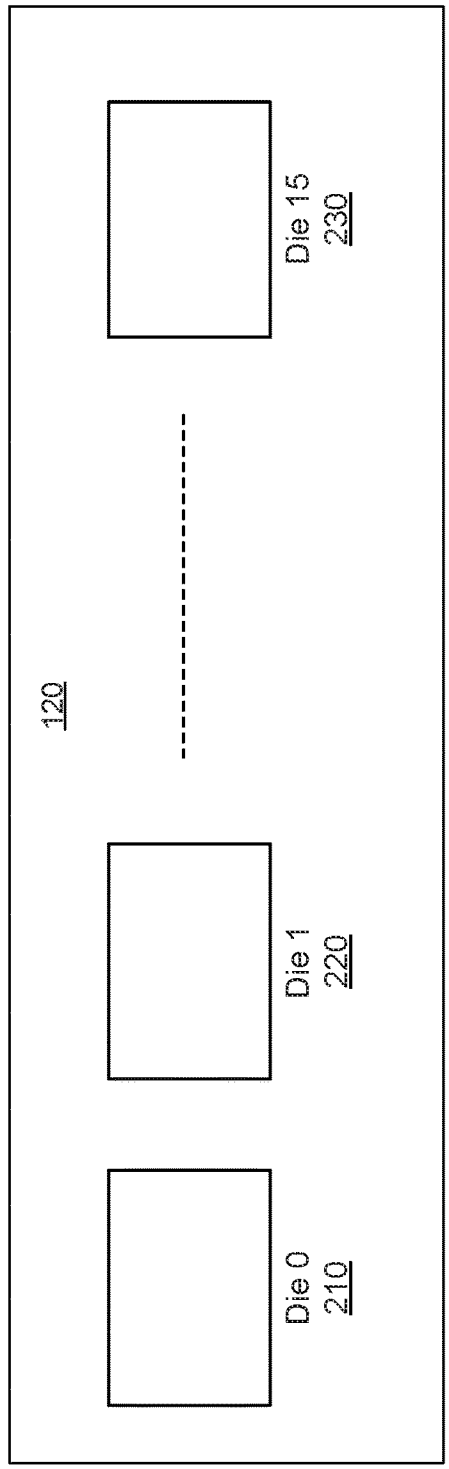
FIG. 2A illustrates example dies in a solid state drive.
Figure 2B:
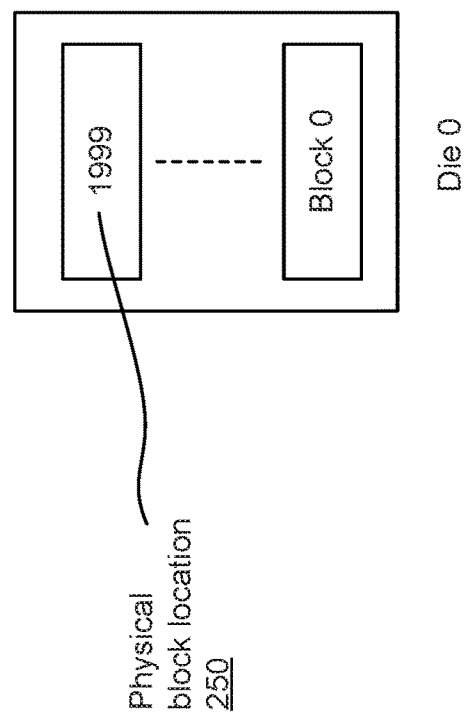
FIG. 2B illustrates example storage blocks in a die.

A solid state drive (SSD), such as storage 120 from the example of FIG. 1, can contain multiple flash memories, each of which typically contains thousands of physical flash memory blocks. A typical flash memory is organized into dies, for example sixteen dies. FIG. 2A illustrates example dies 210, 220, and 230 in a solid state drive. The respective dies can be numbered, e.g., for the purpose of addressing by a flash memory controller. In this example, die 210 is numbered "0" and die 230 is numbered "15." Each die, such as die 210, can in turn contain multiple physical storage blocks, e.g., 2000 blocks. FIG. 2B illustrates example storage blocks in a die. In this example, die "0" can contain many storage blocks, each of which can be addressed by a flash memory controller using a physical block location, such as physical block location 250.

Figure 3A:
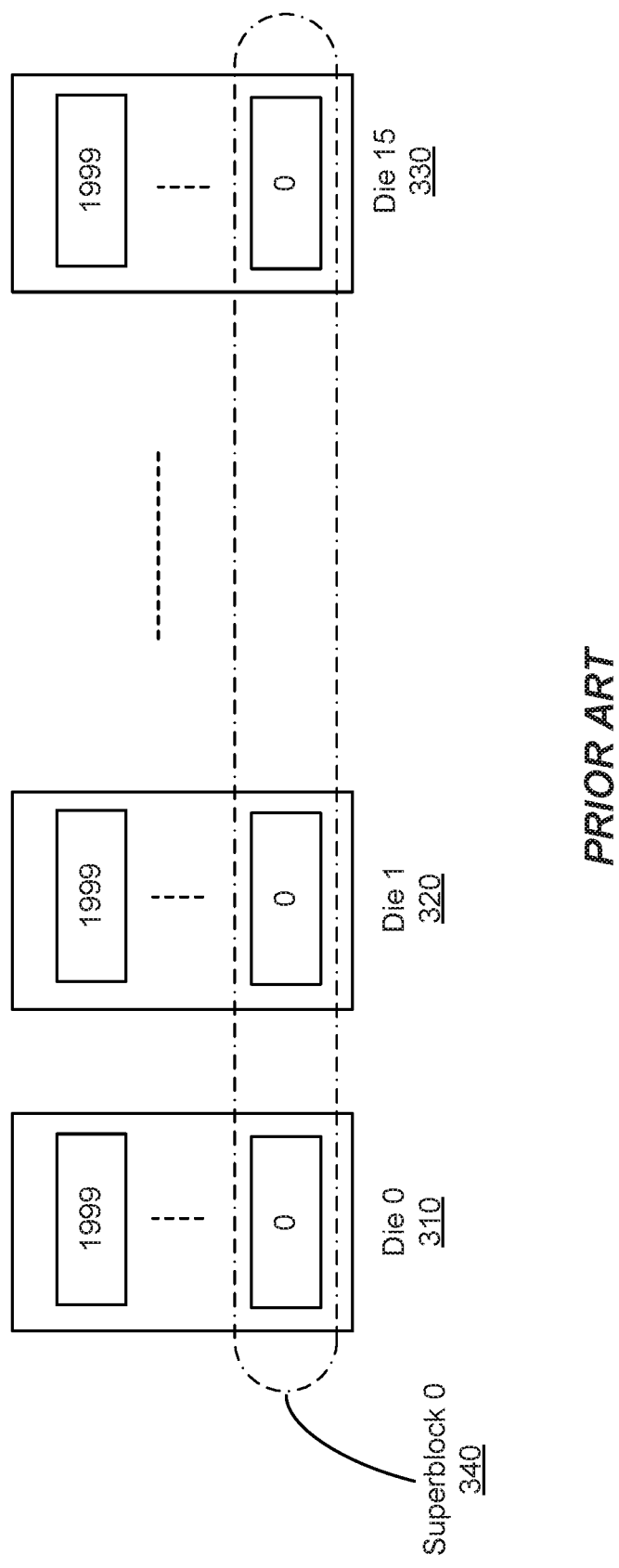
FIG. 3A illustrates conventional superblocks in a solid state drive.

Multiple physical storage blocks located on different dies can be organized into superblocks (SBs), which may be addressable by the controller as logical units. FIG. 3A illustrates conventional superblocks in a solid state drive. Conventional superblocks are typically organized by the physical location of the storage blocks. In this example, all the storage blocks with the same physical block location in their respective dies, such as dies 310, 320, and 330, together form superblock 340. For instance, as shown in FIG. 3A, all the blocks at the first physical location (shown as location "0") on the dies belong to the first superblock (i.e., superblock 340, which can be addressed as superblock "0", as shown). However, this conventional strategy can cause inefficiencies, as the different physical blocks in the same superblock may have different characteristics and their retention capabilities may differ.

In particular, when the controller of a conventional system writes to a storage block without regard to either the update time of the data or the retention time of the storage block, a mismatch between these time scales is likely to occur. If the storage block's retention time is too short compared to the data's update time, the SSD can become unreliable, as uncorrected errors will likely result by the time the data is accessed. Conversely, if the retention time is too long compared to the update time, the controller's data write efficiency can suffer, as fewer blocks with high retention times will be available to store other data. Moreover, if a data file spans multiple storage blocks, the file's storage reliability can be limited by the shortest retention time among the blocks. Since conventional SBs can mix storage blocks of different retention capability, a file written to a given SB can simultaneously span both storage blocks that have shorter and longer retention times than needed. Embodiments of the present disclosure can improve storage efficiency and reliability significantly over conventional SSDs by matching the data's needed update times to the storage blocks' retention capabilites during data writes.

Figure 3B:
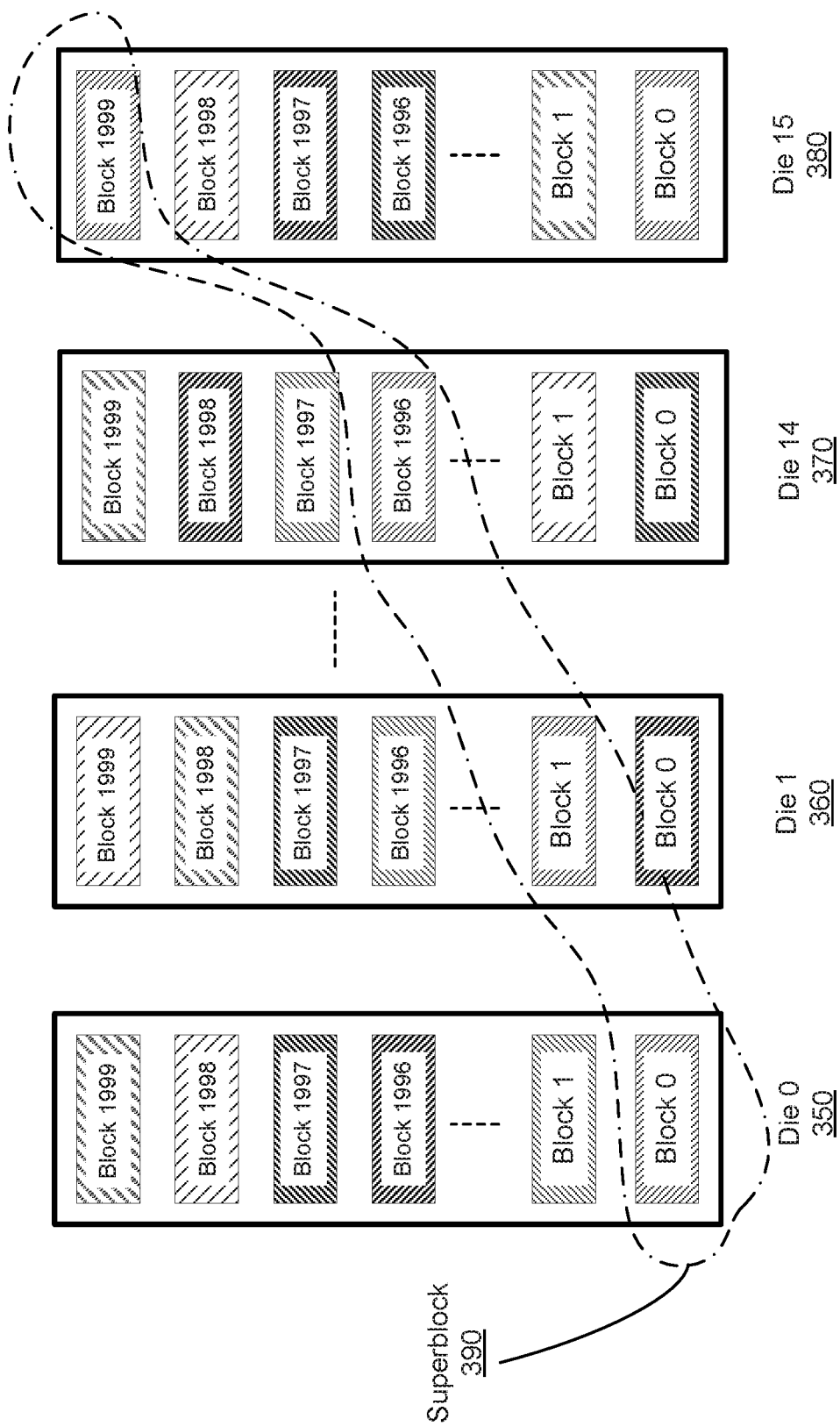
FIG. 3B illustrates superblocks in a solid state drive organized based on retention time, in accordance with embodiments.

The disclosed system and methods can organize SBs according to their performance, and in particular their expected storage retention time. FIG. 3B illustrates superblocks in a solid state drive organized based on retention time, in accordance with embodiments. In this example, the different storage blocks in each die, such as dies 350, 360, 370, and 380, are classified into several groups according to their estimated storage retention time, and assigned with identifiers (e.g., labels, numbers, etc.) according to their respective groups. Each hatching style shown in the figure represents a group. In various embodiments, the groups can be classified into linearly-scaled ranges of retention time, logarithmically-scaled ranges of retention time, or based on any other method of grouping. Alternatively, the groups can be based on an estimated maximum retention time (e.g., less than one day, less than one week, less than one month, less than one year). The classification can be coarse-grained (i.e., to a relatively small number of groups) or fine-grained. In an embodiment, the groups can be classified by a machine learning heuristic, such as clustering or unsupervised learning. Alternatively, the system can have predefined ranges and group the retention times according to these ranges.

Once classified, the system can select the blocks that belong to the same group to form a superblock, such as superblock 390. In this example, the blocks in superblock 390 belong to different dies, and are located at different locations within the respective dies. In this way, the system can minimize the variation of retention capability of physical blocks within each superblock. The system can then access the superblocks based on a superblock identifier and a die number, for example by using a lookup table that associates the identifier and die number with a physical location within the die. For instance and as shown in FIG. 3B, the first block on the first die (i.e., block "0" on die "0") and the last block on the last die (i.e., block "1999" on die "15") both belong to superblock 390, despite having different physical locations on the respective dies, because these blocks have similar or matching retention capabilities.

Figure 4A:
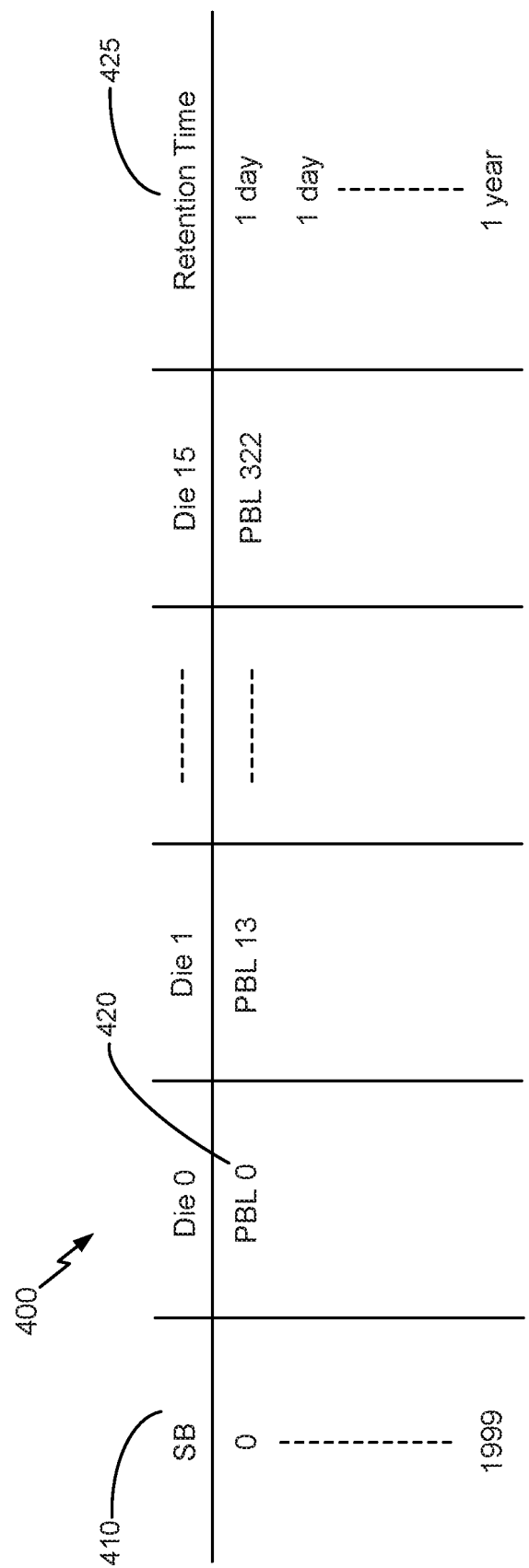
FIG. 4A illustrates an example lookup table associating storage blocks with superblocks, in accordance with embodiments.

FIG. 4A illustrates an example lookup table 400 associating storage blocks with superblocks, in accordance with embodiments. In this example, the table can contain attributes such as a superblock identifier 410, a physical block location 420 for the corresponding superblock in each die (e.g., for 16 dies), and a maximum retention time 425, or retention time range, associated with the superblock. Note that, in various embodiments, the superblock identifier can be a label, number, etc.

In this example, lookup table 400 identifies that the superblock labeled "0" includes a storage block at physical block location "0" on die "0," a storage block at physical block location "13" on die "1," etc. Lookup table 400 further identifies that superblock "0" has a retention capability of one day. The system can thereby determine that each of block "0" on die "0," block "13" on die "1," etc., also has a similar retention capability of one day.

Figure 4B:
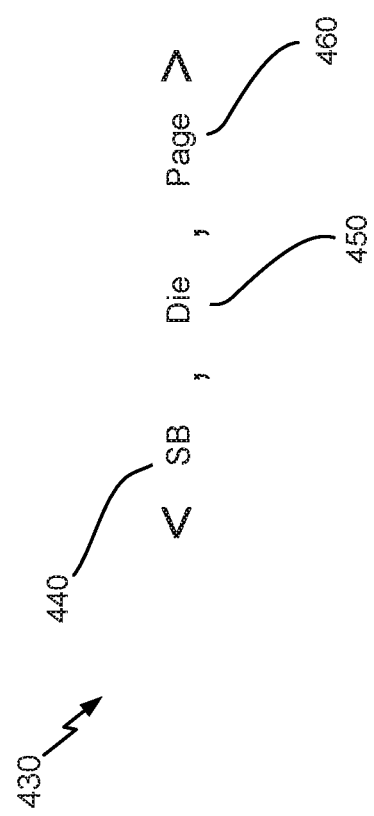
FIG. 4B illustrates an example record identified based on a lookup table, in accordance with embodiments.

FIG. 4B illustrates an example record 430 identified based on a lookup table, in accordance with embodiments. For example, the controller could use record 430 after receiving a write request from a host, in order to translate a logical block address (LBA) received from the host into a physical address for writing the data. In this example, record 430 can contain a series of attributes, such as <SB, Die, Page>. Here, "SB" represents a superblock identifier 440, "Die" a die identifier 450, and "Page" a physical location 460 of a memory page within the die. Accordingly, the lookup table can identify the superblock and the physical location of each block that belongs to the superblock. Identifying the superblock can involve specifying a superblock identifier (e.g., superblock 10), and identifying a block can likewise involve specifying a block identifier (e.g., block 22). The block identifier can correspond to a physical location on the die (e.g., block 22 can be the 22nd block on its respective die).

Figure 4C:
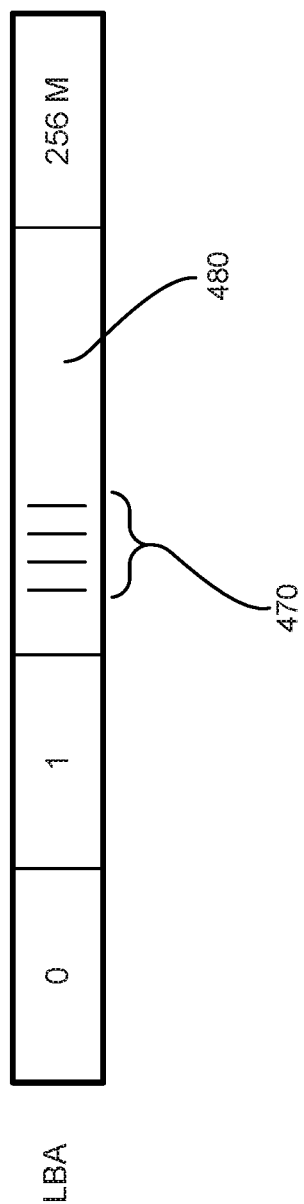
FIG. 4C illustrates logical block addressing, in accordance with embodiments.

FIG. 4C illustrates logical block addressing, in accordance with embodiments. The total storage space (or a continuously-addressable virtual memory space) can be addressed in small chunks, or memory pages, such as 4 kB in size. Each page can be addressed by a logical block address (LBA). For example, if a total storage space is 1 TB, and the memory page size is 4 kB, then the storage contains about 256 million memory pages, addressable by LBAs. In this example, the individual LBAs or LBA ranges can be classified as "hot" or "cold" depending on how frequently the operating system writes to them. For example, if the operating system writes to an LBA range twice 470 within a given time interval, the LBA range 470 can be classified as "hot," which can indicate that a data file associated with LBA range 470 has a short update time. Otherwise, the LBA range such as LBA range 480 can be classified as "cold," indicating a longer update time.

Figure 5:
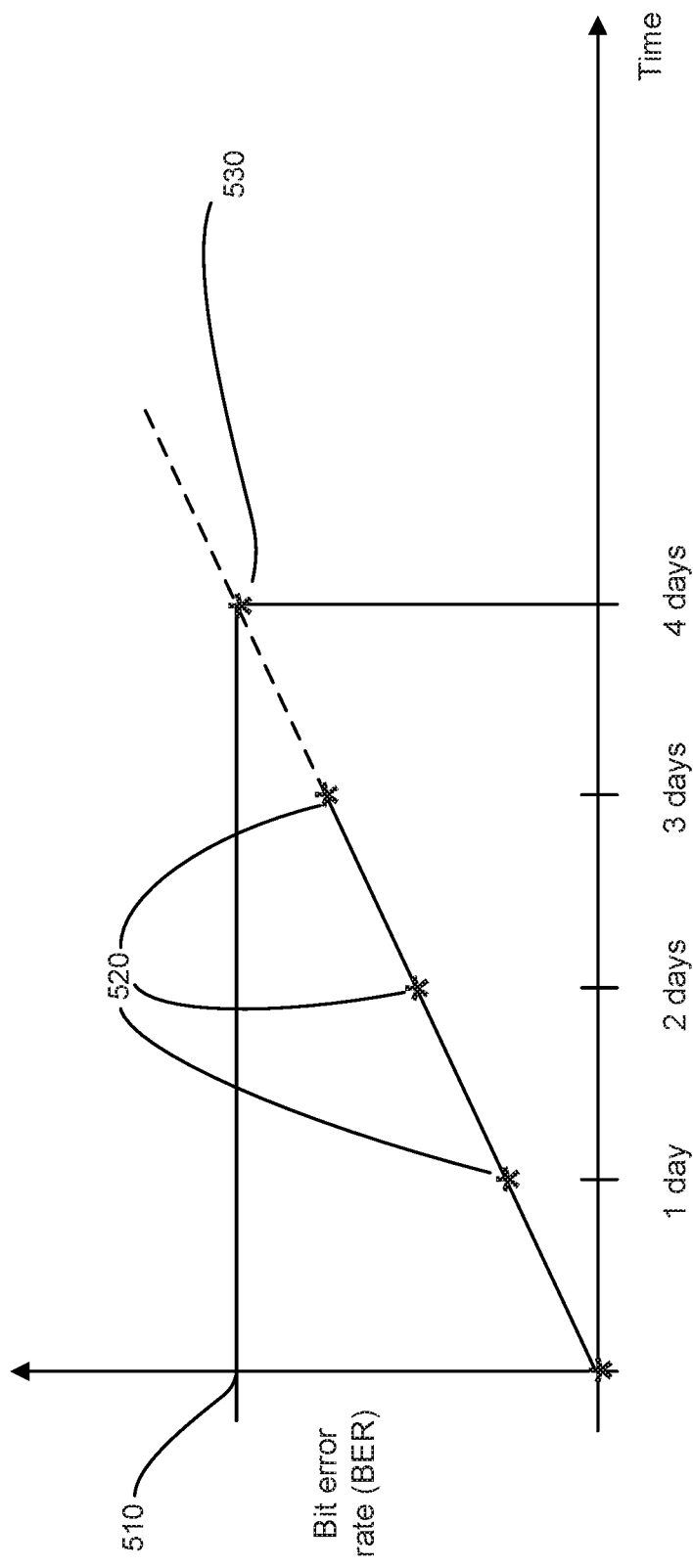
FIG. 5 illustrates estimation of storage block retention time based on an extrapolated retention curve, in accordance with embodiments.

To determine the retention time of the physical storage blocks, the system can perform profiling based on measurements of the storage blocks' raw bit error ratio (BER) or error correction capability as a function of retention time. FIG. 5 illustrates estimation of storage block retention time based on an extrapolated retention curve 520, in accordance with embodiments. The system can sample the raw BER of one or several memory pages in a block immediately after they are programmed. The system can then sample the raw BER at subsequent intervals, e.g., after an hour, several hours, a day, several days, etc. In another example, the system can sample raw BER after a predefined number of write or read cycles, e.g., after one-hundred data writes to the block, after two-hundred data reads from the block, etc. Based on such online measurement, the controller can obtain a relationship 520 between raw BER and retention time. The system can also make use of information regarding the errors that can be tolerated by an error-correcting code (ECC) system for a fixed flash controller. In an embodiment, the system can use the ECC's error correction capability, e.g., a number of bit errors that the ECC can correct in a given physical storage block.

In an example, a storage block can contain a plurality of wordlines, or rows of memory cells. The ECC can decode the respective wordlines separately, in order to detect and correct errors. For wordlines containing too many errors to be decoded, the ECC can decode these "failed" wordlines by using information about other wordlines in the same block, or superblock. For example, the system can use a method such as chipkill, or any other method, to decode such failed wordlines, and is not limited by the present disclosure. Accordingly, the ECC can correct up to a certain total number of bit errors, for example, 200 bit errors out of the block's total storage capacity, e.g. 4 kB of data. The controller can then set a threshold number 510 of errors, e.g. a fixed proportion such as 80% of this maximum, or 160 bit errors.

The system can use a measured BER to determine whether a block supports this capability, so that the ECC will be able to correct the wordlines of the block. In an embodiment, the system is not limited to this capability, and can compare to another threshold number or fixed proportion such as 80% of the capability, or 160 bit errors, to provide a safety margin. To determine whether the block can support the capability, the system can sample a page of the block, and measure the number of bit errors that the ECC provides. In a typical example, the ECC may not be able to correct all the errors, but can output a checksum indicating the number of bit errors present. The system can then generate the BER as a ratio of the number of error bits detected to the total number of bits decoded from the page. The system can repeat such measurements over time (e.g., at day 0, day 1, day 2, and day 3, as shown).

The controller can then extrapolate the measured raw BER relationship 520 to predict the retention time of each physical block. The controller can convert the BER to the number of bit errors given the total number of bits in the page and compare this extrapolated number to the preset number of the error correction capability (e.g., 80% of 200=160 bit errors). In this example, the raw BER curve is predicted to reach the bit error threshold 510 (for example, 160 bit errors) for a particular physical storage block after four days, based on an extrapolation 530 of the observed historical relationship. Therefore, the controller can estimate that the physical block has a retention lifetime of four days. Based on such predictions, the system can profile each flash physical block, and coarsely classify the blocks into a few limited groups.

Figure 6:
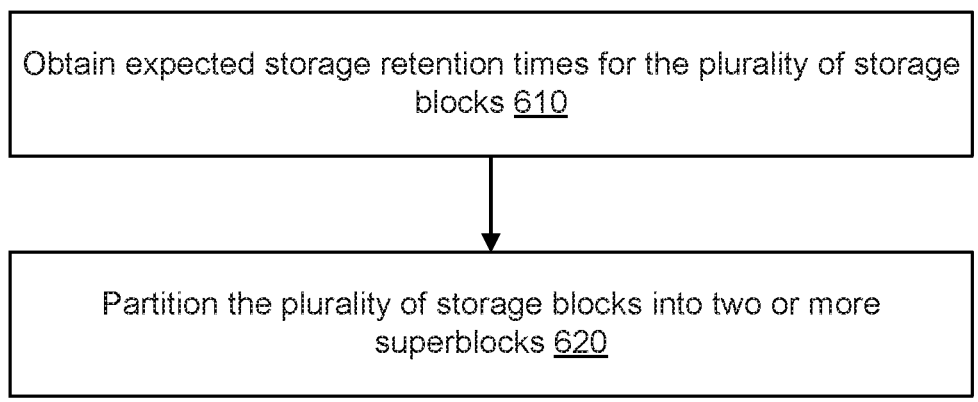
FIG. 6 illustrates an example flow for improving retention efficiency of a storage medium, according to an embodiment.

FIG. 6 illustrates an example flow for improving retention efficiency of a storage medium, according to an embodiment. The storage medium can include a plurality of storage blocks located within a plurality of dies. A computer system, storage device, or controller, such as a flash memory controller, is described as performing particular operations of the example flow. In an example, the computer system can include one or more processors and one or more memories, including the data storage device. The memory(ies) stores computer-readable instructions to embody functionalities specific to the system. The instructions when executed by the processor(s) of the computer system result in performance of the operations. The instructions stored in the memory(ies) in conjunction with the underlying processor(s) represent a means for performing the operations. Although the operations are illustrated in a particular order, other arrangements of the operations are possible and some of the operations may be skipped as it would be apparent to a person skilled in the art.

As illustrated, the example flow starts at operation 610, where the system obtains expected storage retention times for a plurality of storage blocks. As discussed in the example of FIG. 5, the system can determine the storage retention times by estimating the BER of the physical storage block, and extrapolating the observed relationship between BER and time. In an embodiment, the system can further update the estimated storage retention times. For example, the system can determine that one or more expected storage retention times should be updated when at least a predefined number of write operations have been performed to a superblock. The system can then re-estimate the BER, and update the estimate of storage block retention times.

At operation 620, the system partitions the plurality of storage blocks into two or more superblocks. In an embodiment, the system can partition the storage blocks based on identifying matches among the retention times of various blocks, and forming superblocks based on the identified matches. In particular, such matching can be performed based on machine learning techniques, such as clustering or unsupervised learning. Alternatively, the system can have predefined, or predetermined, retention time ranges for the superblocks, and group the estimated retention times by matching them with these ranges.

For example, suppose the predefined ranges include less than a week, between one week and one month, and more than one month. If a block on a die has an estimated retention time of one to seven days, the block can be labeled with a first identifier associated with the first range of less than a week. If the block's estimated retention time is between 8 and 30 days, the block can instead be labeled with a second identifier associated with the second range of a week to a month.

In some embodiments, a respective superblock includes one block on each die, and cannot include multiple blocks on the same die. In an example, the controller can organize multiple superblocks with similar retention capabilities, so that if two blocks on the same die have equal or similar retention times, the controller can assign them to two different superblocks of appropriate retention capability. The controller can assign the blocks to superblocks by closest matching to their retention times, or if both superblocks have the same retention capability, can assign the storage blocks randomly or sequentially.

Figure 7:
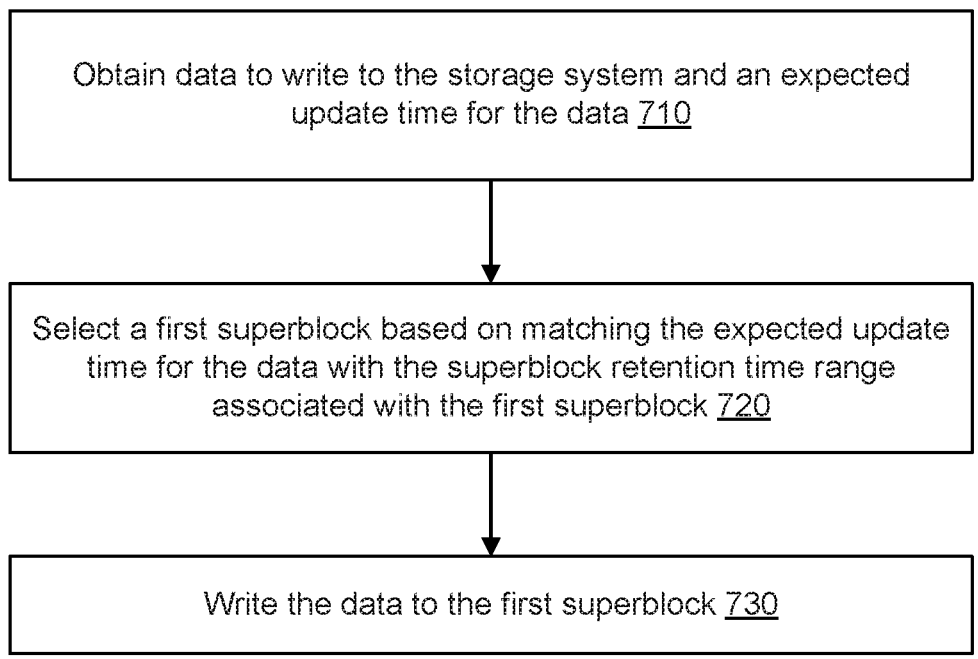
FIG. 7 illustrates an example flow for writing to a superblock, according to an embodiment.

Having organized the physical storage blocks into superblocks, the system can match new write requests to the superblocks, based on expected update times and the superblock retention times. In particular, to improve SSD retention efficiency and reliability and reduce data refresh frequency and write amplification, the system can use an estimate of the update frequency of data to match requested data writes to superblocks comprising storage blocks with appropriate retention times. FIG. 7 illustrates an example flow for writing to a superblock, according to an embodiment. The example flow starts at operation 710, where the system obtains data to write to the storage system and an expected update time for the data. In an example, the write request and/or the data to write may be received from a host. Before writing the new data to an SSD, the system can first check the data's predicted next update time.

To determine the expected update time, in some embodiments the disclosed system can leverage prediction of the update period of the data files being written. In an SSD, such information may be available from a protocol such as Non-Volatile Memory Express (NVMe), in which software on the host can provide information about data write access frequency. Accordingly, in some embodiments the system determines the update period based on receiving such information from a host. For non-NVMe drives, the controller can instead perform historical tracking of the update frequency of a data file, or of a specified LBA range. As discussed in the example of FIG. 4C, the system can track write patterns and analyze "hot" and "cold" LBA ranges to determine historical update frequencies of particular ranges and/or files. Based on such historical tracking, the system can predict an expected update time for the write request, for example by extrapolating historical trends into the future, and/or by inferring likely user behavior.

Next, at operation 720, the system selects a first superblock based on matching the expected update time for the data with the superblock retention time range associated with the first superblock. For example, if the predicted update time is within a day, the controller can program the data to a superblock or physical block with an expected maximum retention time of one day. If the predicted update time is within a week, the controller can program such data to a superblock or physical block capable of retaining data for one week. Finally, at operation 730, the system writes the data to the selected superblock.

Figure 8:
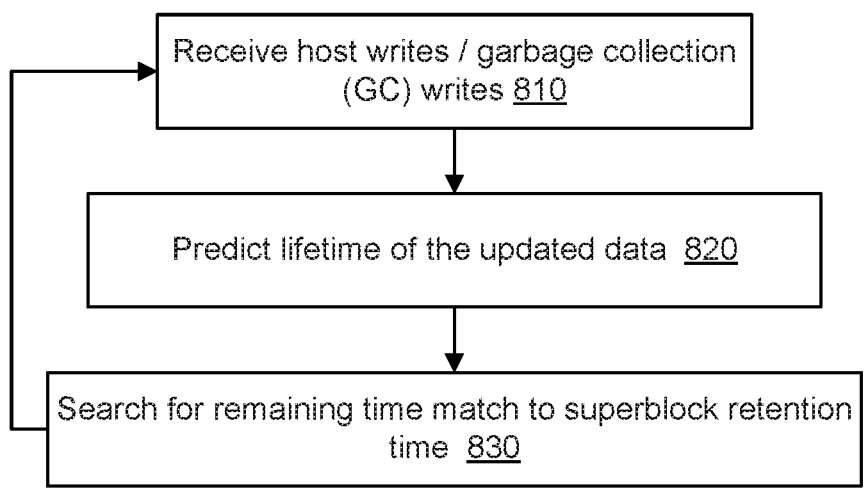
FIG. 8 illustrates an example flow for selecting a superblock to write, according to an embodiment.

In an embodiment, the system adjusts the expected update time and/or superblock retention time based on time already elapsed. FIG. 8 illustrates an example flow for selecting a superblock to write based on matching an expected data update time with a superblock retention time, according to an embodiment. As illustrated, the example flow starts at operation 810, where the system receives write requests from a host or garbage collection (GC) system. Next, at operation 820, the system predicts an update lifetime of the updated data. As described in the examples of FIGS. 4C and 7, the system can estimate the update lifetime of the data to be written based on a predicted lifetime. The system can then adjust the update time for the data based on a time elapsed since a previous update. For example, the system can set a GC write lifetime of an LBA and/or data file to the originally predicted value, minus the time elapsed since the host last wrote such data.

Likewise, the system can adjust the superblock retention times or retention time ranges based on a time elapsed since the first superblock was opened. At operation 830, the system searches for a remaining time match to the superblock retention times or retention time ranges. For each open superblock of multi-streams, if the superblock is newly open, the system can obtain the retention lifetime of the SB, as described in the examples of FIGS. 5 and 7. If the SB is already open, the system can adjust the SB retention lifetime based on a time elapsed since the first superblock was opened. For example, the system can set the remaining SB lifetime to the estimated lifetime minus the time elapsed since the SB was opened. In one example, the system can program a data file with a short update lifetime to a SB with a long retention capability, if the SB has been open for a significant time, and therefore has a short remaining lifetime matching the LBA's or data file's lifetime.

As in the example of FIG. 7, the system can then map the data write to a SB and/or physical storage block by matching the data remaining lifetime with the remaining lifetime of the SB or block. The system then writes to the selected SB and/or physical storage block.

In some embodiments, the system can utilize a lookup table to associate LBAs, storage blocks, and superblocks, as in the examples of FIGS. 4A, 4B, and 4C. For example, when writing to the selected SB, the system can locate a storage block within the SB based on a lookup in a table. The table can comprise records containing an SB identifier, a die number, and a physical location of the storage block within the SB.

Figure 9:
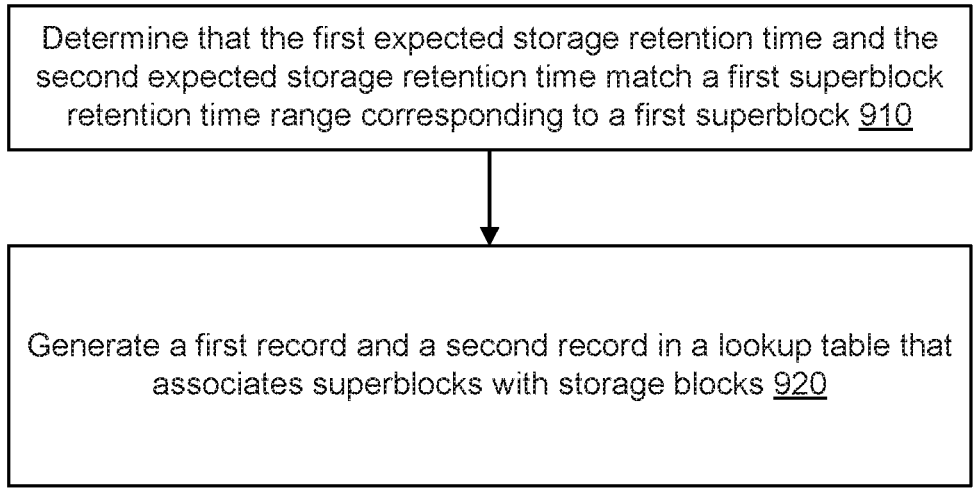
FIG. 9 illustrates an example flow for generating a superblock lookup table, according to an embodiment.

In an example, when grouping the plurality of storage blocks into superblocks, the system can further generate records in the lookup table. FIG. 9 illustrates an example flow for generating a superblock lookup table that associates superblocks with storage blocks, according to an embodiment. The example flow starts at operation 910, where the system determines that a first expected storage retention time of a first storage block and a second expected storage retention time of a second storage block match a first superblock retention time range corresponding to a first superblock. The first storage block can have a first physical location within a first die in the storage medium. The second storage block can have a second physical location within a second die in the storage medium. The second physical location need not correspond to the first physical location, i.e. the first and second storage blocks need not have the same physical location in their respective dies.

In an example, in operation 910, the first superblock has not yet been generated. That is, determining that the first and second expected storage retention times match may simply involve comparing the first and second expected storage retention times to each other. Alternatively, the system can use a machine learning or clustering heuristic to determine that the first and second expected storage retention times are similar, for example by determining that they are more similar to each other than to the retention times of other storage blocks in the SSD. Based on such a determination, the system may then decide to form a new superblock including the first and second storage blocks.

In another example, the first superblock can already exist, and the system can determine that both the first and second expected storage retention times match the first superblock. In an embodiment, the system can determine this based on an existing first superblock retention time, or retention time range, corresponding to the first superblock. Alternatively, the system can change the first superblock retention time range based on the match to the first and second expected storage retention times. For example, the system could use a clustering or unsupervised learning heuristic to determine that the first and second expected storage retention times match the first superblock more closely than any other superblocks. In an embodiment, the system could then modify the first superblock retention time range based on the first and second expected storage retention times.

Having matched the first and second storage blocks to the first superblock, at operation 920, the system generates a first record and a second record in the lookup table. The first record can associate the first physical location with the first superblock, and the second record can associate the second physical location with the first superblock.

Figure 10:
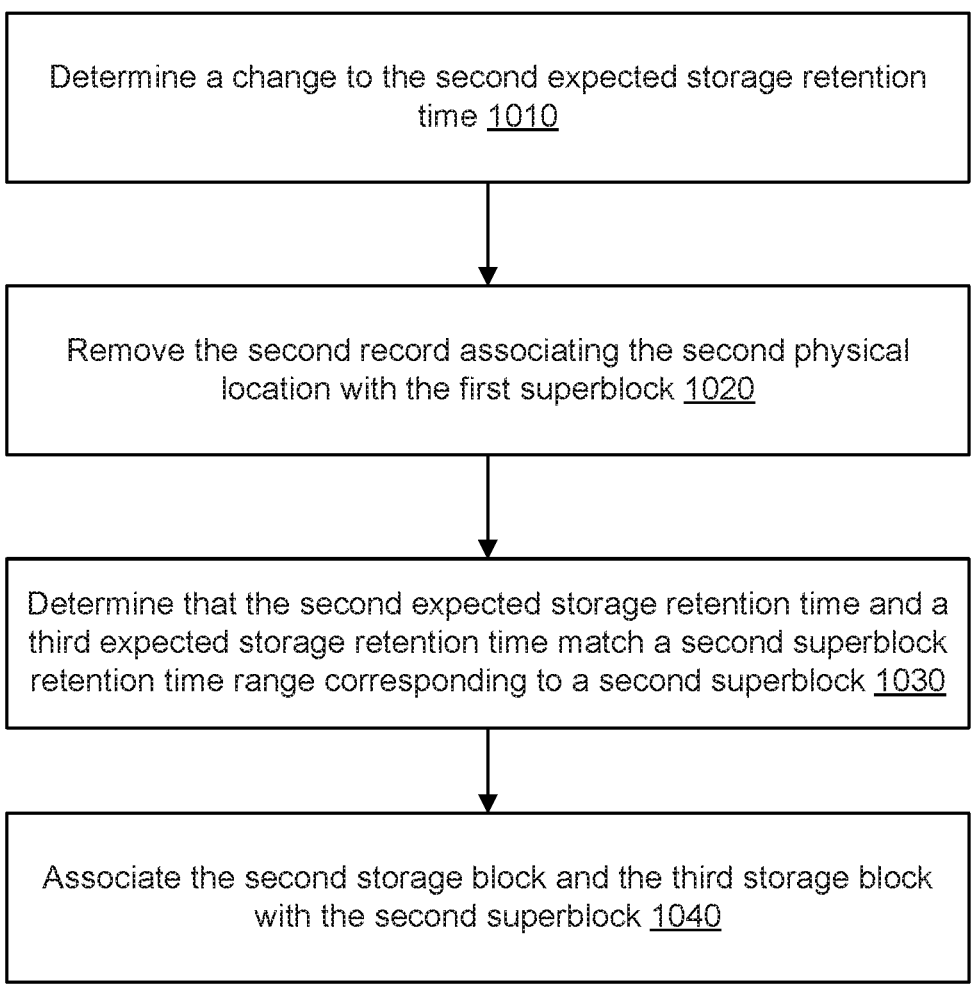
FIG. 10 illustrates an example flow for updating a superblock lookup table, according to an embodiment.

In addition, the system can also update the lookup table based on changes to the estimated retention times. FIG. 10 illustrates an example flow for updating a superblock lookup table, according to an embodiment. This example flow can provide further detail to the example flow of FIG. 9. The example flow starts at operation 1010, where the system determines a change to the second expected storage retention time. Next, at operation 1020, the system removes the second record associating the second physical location with the first superblock. Then, at operation 1030, the system determines that the second expected storage retention time and a third expected storage retention time of a third storage block on the first memory die match a second superblock retention time range corresponding to a second superblock. Finally, at operation 1040, the system updates a record in the lookup table to associate the second storage block and the third storage block with the second superblock.

Figure 11:
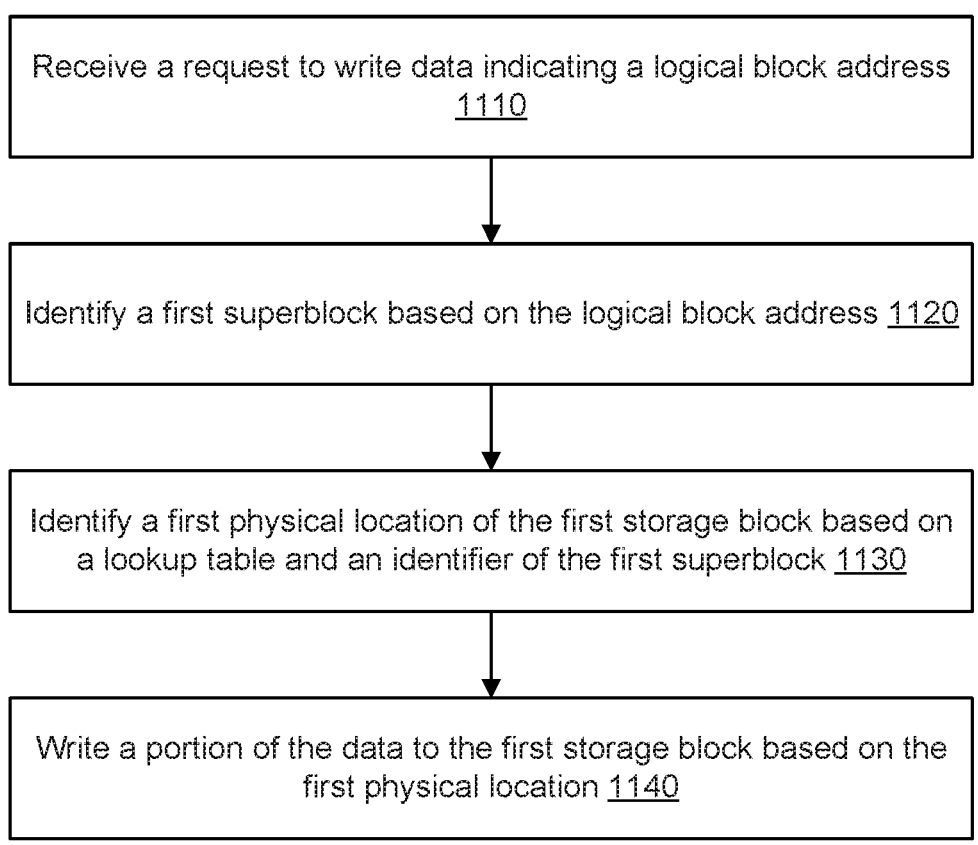
FIG. 11 illustrates an example flow for selecting a superblock to write based on a superblock lookup table, according to an embodiment.

As described above, the system can also use the lookup table when writing data to a SB. FIG. 11 illustrates an example flow for selecting a superblock to write based on a superblock lookup table, according to an embodiment. The example flow starts at operation 1110, where the system receives a request to write data, indicating an LBA, from a host. At operation 1120, the system identifies a first superblock based on the received LBA. At operation 1130, the system identifies a first physical location of the first storage block based on the lookup table and an identifier of the first superblock. Finally, at operation 1140, the system writes a portion of the data to the first storage block based on the first physical location.

Figure 12:
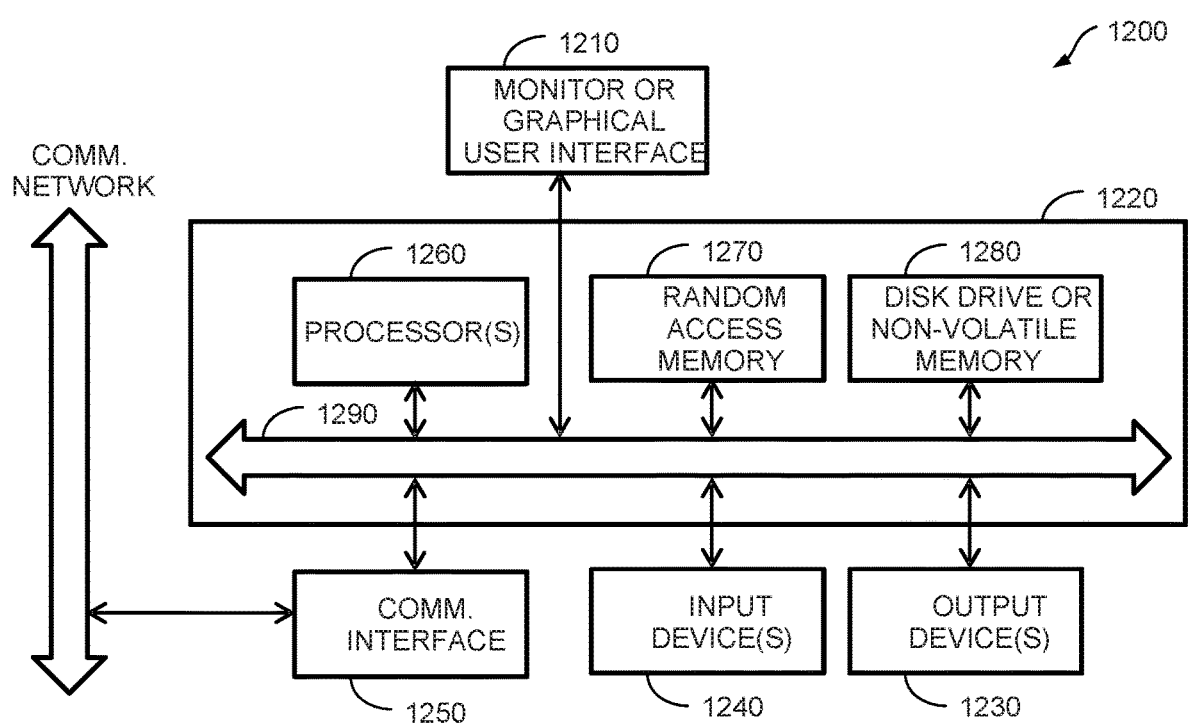
FIG. 12 illustrates one potential implementation of a system which may be used, according to certain embodiments of the present disclosure.

FIG. 12 illustrates one potential implementation of a system which may be used, according to certain embodiments of the present disclosure. FIG. 12 is merely illustrative of an embodiment of the present disclosure and does not limit the scope of the disclosure as recited in the claims. In one embodiment, the system is a computer system 1200 that typically includes a monitor 1210, a computer 1220, user output devices 1230, user input devices 1240, communications interface 1250, and the like.

As shown in FIG. 12, the computer 1220 may include a processor(s) 1260 that communicates with a number of peripheral devices via a bus subsystem 1290. These peripheral devices may include the user output devices 1230, the user input devices 1240, the communications interface 1250, and a storage subsystem, such as random access memory (RAM) 1270 and disk drive 1280.

The user input devices 1230 include all possible types of devices and mechanisms for inputting information to the computer system 1220. These may include a keyboard, a keypad, a touch screen incorporated into the display, audio input devices such as voice recognition systems, microphones, and other types of input devices. In various embodiments, the user input devices 1230 are typically embodied as a computer mouse, a trackball, a track pad, a joystick, wireless remote, drawing tablet, voice command system, eye tracking system, and the like. The user input devices 1230 typically allow a user to select objects, icons, text and the like that appear on the monitor 1210 via a command such as a click of a button or the like.

The user output devices 1240 include all possible types of devices and mechanisms for outputting information from the computer 1220. These may include a display (e.g., the monitor 910), non-visual displays such as audio output devices, etc.

The communications interface 1250 provides an interface to other communication networks and devices. The communications interface 1250 may serve as an interface for receiving data from and transmitting data to other systems. Embodiments of the communications interface 1250 typically include an Ethernet card, a modem (telephone, satellite, cable, ISDN), (asynchronous) digital subscriber line (DSL) unit, FireWire interface, USB interface, and the like. For example, the communications interface 1250 may be coupled to a computer network, to a FireWire bus, or the like. In other embodiments, the communications interfaces 1250 may be physically integrated on the motherboard of the computer 1220, and may be a software program, such as soft DSL, or the like.

In various embodiments, the computer system 1200 may also include software that enables communications over a network such as the HTTP, TCP/IP, RTP/RTSP protocols, and the like. In alternative embodiments of the present disclosure, other communications software and transfer protocols may also be used, for example IPX, UDP or the like. In some embodiments, the computer 1220 includes one or more Xeon microprocessors from Intel as the processor(s) 1260. Further, in one embodiment, the computer 1220 includes a UNIX-based operating system.

The RAM 1270 and the disk drive 1280 are examples of tangible media configured to store data such as embodiments of the present disclosure, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The RAM 1270 and the disk drive 1280 may be configured to store the basic programming and data constructs that provide the functionality of the present disclosure.

Software code modules and instructions that provide the functionality of the present disclosure may be stored in the RAM 1270 and the disk drive 1280. These software modules may be executed by the processor(s) 1260. The RAM 1270 and the disk drive 1280 may also provide a repository for storing data used in accordance with the present disclosure.

The RAM 1270 and the disk drive 1280 may include a number of memories including a main random access memory (RAM) for storage of instructions and data during program execution and a read only memory (ROM) in which fixed non-transitory instructions are stored. The RAM 1270 and the disk drive 1280 may include a file storage subsystem providing persistent (non-volatile) storage for program and data files. The RAM 1270 and the disk drive 1280 may also include removable storage systems, such as removable flash memory.

The bus subsystem 1290 provides a mechanism for letting the various components and subsystems of the computer 1220 communicate with each other as intended. Although the bus subsystem 1290 is shown schematically as a single bus, alternative embodiments of the bus subsystem may utilize multiple busses.

FIG. 12 is representative of a computer system capable of embodying the present disclosure. It will be readily apparent to one of ordinary skill in the art that many other hardware and software configurations are suitable for use with the present disclosure. For example, the computer may be a desktop, portable, rack-mounted, or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present disclosure can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A storage system with improved retention efficiency, comprising:
   a plurality of dies;
   a plurality of storage blocks located within the plurality of dies; and
   a controller configured to:
   obtain expected storage retention times for the plurality of storage blocks by at least:
   estimating a bit error rate (BER) of a memory page of a first storage block of the plurality of storage blocks, and
   obtaining an expected storage retention time of the first storage block by at least extrapolating a relationship between the BER and the expected storage retention time of the first storage block, wherein the expected storage retention time of the first storage block indicates a time duration (i) during which the first storage block is expected to remain usable to retain data and (ii) after which the first storage block is expected to become unusable to retain the data;
   group the plurality of storage blocks into two or more superblocks based on the expected storage retention times, wherein a respective superblock:
   is associated with a superblock retention time range; and comprises storage blocks having expected storage retention times within the superblock retention time range;

obtain data to write to the storage system and an expected update time for a next update of a file associated with the data;

select a first superblock based on matching the expected update time with a first superblock retention time range associated with the first superblock; and write the data to the first superblock.

2. The storage system of claim 1, wherein obtaining the expected storage retention times comprises obtaining a storage retention time of each one of the plurality of storage blocks.

3. The storage system of claim 1, wherein while writing the data to the first superblock, the controller is further configured to:

locate a storage block within the first superblock based on a lookup in a table comprising records, wherein a respective record in the table contains a superblock identifier, a die identifier, and a physical location of the storage block within the first superblock.

4. The storage system of claim 1, wherein the expected update time is obtained from one or more of:

information provided by a host; and a prediction made by the controller based on historical tracking.

5. The storage system of claim 4, wherein the information provided by the host comprises historical data write access frequency information.

6. The storage system of claim 4, wherein the historical tracking comprises historical tracking of an update frequency of the file associated with the data.

7. The storage system of claim 1, wherein while selecting the first superblock based on matching the expected update time with the first superblock retention time range, the controller is further configured to do one or more of:

adjust the expected update time for the data based on a time elapsed since a previous update; and adjust the superblock retention time range associated with the first superblock based on a time elapsed since the first superblock was opened.

8. The storage system of claim 1, wherein while obtaining the expected storage retention times, the controller is further configured to, for each storage block of the plurality of storage blocks, estimate a corresponding BER, and extrapolate a corresponding relationship between a storage retention time of the storage block and the corresponding BER.

9. The storage system of claim 1, the controller further configured to:

determine that at least a predefined number of write operations have been performed to the first superblock;

re-estimate the BER; and update one or more expected storage retention times.

10. The storage system of claim 1, wherein a respective superblock includes storage blocks located in two or more different dies.

11. The storage system of claim 1, wherein the storage blocks comprise non-transitory memory blocks.

12. A storage device with improved retention efficiency, the storage device comprising:

a controller configured to:

obtain expected storage retention times for a plurality of storage blocks located within a plurality of dies by:

estimating a bit error rate (BER) of a memory page of a first storage block of the plurality of storage blocks, and obtaining an expected storage retention time of the first storage block by at least extrapolating a relationship between the BER and the expected storage retention time of the first storage block, wherein the expected storage retention time of the first storage block indicates a time duration (i) during which the first storage block is expected to remain usable to retain data and (ii) after which the first storage block is expected to become unusable to retain the data; and group the plurality of storage blocks into two or more superblocks based on the expected storage retention times, wherein a respective superblock:

is associated with a superblock retention time range; and comprises storage blocks having expected storage retention times within the superblock retention time range;

obtain data to write to the storage device and an expected update time for a next update of a file associated with the data;

select a first superblock based on matching the expected update time with a first superblock retention time range associated with the first superblock; and write the data to the first superblock.

13. The storage device of claim 12:

wherein the plurality of storage blocks includes:

the first storage block having a first physical location within a first die; and a second storage block having a second physical location within a second die in the plurality of dies and having a different expected storage retention time, the first physical location not corresponding to the second physical location; and wherein while grouping the plurality of storage blocks, the controller is further configured to:

determine that the expected storage retention time and the different expected storage retention time match the first superblock retention time range corresponding to the first superblock; and generate a first record and a second record in a lookup table that associates superblocks with storage blocks, the first record associating the first physical location with the first superblock, and the second record associating the second physical location with the first superblock.

14. The storage device of claim 13, wherein the controller is further configured to update the lookup table by:

determining a change to the different expected storage retention time such that the different expected storage retention time no longer matches the first superblock retention time range;

removing the second record associating the second physical location with the first superblock;

determining that the different expected storage retention time and another expected storage retention time of a third storage block on the first die match a second superblock retention time range corresponding to a second superblock; and associating the second storage block and the third storage block with the second superblock.

15. The storage device of claim 12, wherein the expected update time is obtained from one or more of:
    information provided by a host; and
    a prediction made by the controller based on historical tracking.

16. A method for improving retention efficiency of a storage medium comprising a plurality of storage blocks located within a plurality of dies, the method performed by a controller and comprising:
    obtaining expected storage retention times for the plurality of storage blocks by at least:
        estimating a bit error rate (BER) of a memory page of a first storage block of the plurality of storage blocks, and
        obtaining an expected storage retention time of the first storage block by at least extrapolating a relationship between the BER and the expected storage retention time of the first storage block, wherein the expected storage retention time of the first storage block indicates a time duration (i) during which the first storage block is expected to remain usable to retain data and (ii) after which the first storage block is expected to become unusable to retain the data;
    grouping the plurality of storage blocks into two or more superblocks based on the expected storage retention times, wherein a respective superblock:
        is associated with a superblock retention time range; and
        comprises storage blocks having expected storage retention times within the superblock retention time range;
    obtaining data to write to the storage medium and an expected update time for a next update of a file associated with the data;
    selecting a first superblock based on matching the expected update time with a first superblock retention time range associated with the first superblock; and
    writing the data to the first superblock.

17. The method of claim 16, further comprising:
    receiving, by the controller and from a host, a request to write data indicating a logical block address;
    identifying the first superblock based on the logical block address;
    identifying a first physical location of the first storage block based on a lookup table and an identifier of the first superblock; and
    writing a portion of the data to the first storage block based on the first physical location.

18. The method of claim 16, wherein writing the data to the first superblock further comprises:
    locating a storage block within the first superblock based on a lookup in a table comprising records, wherein a respective record in the table contains a superblock identifier, a die identifier, and a physical location of the storage block within the first superblock.

19. The method of claim 16, wherein the expected update time is obtained from one or more of:
    information provided by a host; and
    a prediction made by the controller based on historical tracking.

20. The method of claim 16, wherein obtaining the expected storage retention times further comprises obtaining a storage retention time of each one of the plurality of storage blocks.

* * * * *